United States Patent
Chi et al.

(10) Patent No.: US 12,229,115 B2
(45) Date of Patent: Feb. 18, 2025

(54) TRIGGER EXECUTION FOR TRIGGERS HAVING MULTIPLE INSERT OPERATIONS

(71) Applicant: SAP SE, Walldorf (DE)

(72) Inventors: Eun Kyung Chi, Seoul (KR); Heeyeon Jo, Seoul (KR)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 18/217,943

(22) Filed: Jul. 3, 2023

(65) Prior Publication Data

US 2025/0013628 A1  Jan. 9, 2025

(51) Int. Cl.
  *G06F 16/23* (2019.01)
  *G06F 16/2455* (2019.01)

(52) U.S. Cl.
  CPC .... *G06F 16/2365* (2019.01); *G06F 16/24565* (2019.01)

(58) Field of Classification Search
  CPC .............. G06F 16/2365; G06F 16/24565
  See application file for complete search history.

(56) References Cited

U.S. PATENT DOCUMENTS

2015/0112923 A1   4/2015  Driesen et al.

OTHER PUBLICATIONS

Kvet et al. "Trigger Performance Characteristics in Temporal Environment," 2016 International Conference on Systems Informatics, Modelling and Simulation (SIMS), IEEE, 2016. (Year: 2016).*
Extended European Search Report received in European Application No. 24183010.8, dated Dec. 17, 2024, 10 pages.
"Prepared Statement" Wikipedia, Jun. 17, 2023, pp. 1-7.

* cited by examiner

*Primary Examiner* — Jay A Morrison
(74) *Attorney, Agent, or Firm* — Klarquist Sparkman, LLP

(57) ABSTRACT

Techniques and solutions are provided for executing database triggers. In particular, disclosed techniques allow for the creation of database triggers with multiple insert statements. For a trigger that includes first and second insert statements, first and second tables are created, respectively for the first and second insert statements, that each include a sequence column. At least the first insert statement references a sequence that is incremented during trigger execution. The sequence columns of the first and second tables have a number of elements corresponding to a number of times a given insert operation will execute as a result of a database operation that satisfies the conditions of the trigger. The first and second insert operations are executed using the respective first and second tables.

20 Claims, 10 Drawing Sheets

608

CREATE COLUMN SUBJECT TABLE ( MANDT int primary key, COL1 nvarchar(10), COL2 int);
CREATE COLUMN LOGGING TABLE ( sequence_col bigint, snapshot_timestamp nvarchar(30), MANDT int, COL1 nvarchar(10), COL2 int, operation nvarchar(1));     610

CREATE TRIGGER "SAPICH"."TRIGGER_INSERT" AFTER INSERT ON "SAPICH"."SUBJECT"
REFERENCING NEW ROW NEW FOR EACH ROW
  BEGIN                                                                                              616
    INSERT INTO LOGGING  VALUES (
"SEQ".NEXTVAL,TO_CHAR(CURRENT_UTCTIMESTAMP),:NEW."MANDT",  :NEW."COL1',
:NEW."COL2', 'I');
END;
INSERT INTO SUBJECT VALUES ( ?, ?) ; -- batch parameters CREATE TRIGGER "SAPICH"."TRIGGER_UPDATE" AFTER UPDATE ON "SAPICH"."SUBJECT" 618
REFERENCING NEW ROW NEW FOR EACH ROW
  BEGIN                    630
    INSERT INTO LOGGING  VALUES (
"SEQ".NEXTVAL,TO_CHAR(CURRENT_UTCTIMESTAMP),:NEW."MANDT",  :NEW."COL1",
:NEW."COL2', 'I');
END;
UPDATE SUBJECT SET COL1 = ? WHERE MANDT = ? ; -- batch parameters CREATE TRIGGER "SAPICH"."TRIGGER_DELETE" AFTER DELETE ON "SAPICH"."SUBJECT" 620
REFERENCING OLD ROW OLD FOR EACH ROW
  BEGIN
    INSERT INTO LOGGING  VALUES (
"SEQ".NEXTVAL,TO_CHAR(CURRENT_UTCTIMESTAMP),:OLD."MANDT",  :OLD."COL1",
:OLD."COL2', 'I');
  END;
DELETE FROM SUBJECT WHERE MANDT = ? ; -- batch parameters

FIG. 6A

CREATE COLUMN SUBJECT TABLE ( MANDT int primary key, COL1 nvarchar(10), COL2 int); ⟵650
CREATE COLUMN LOGGING1 TABLE ( sequence_col bigint, snapshot_timestamp nvarchar(30), MANDT int, COL1 nvarchar(10), COL2 int, operation nvarchar(1)); ⟵652
CREATE COLUMN LOGGING2 TABLE ( sequence_col bigint, snapshot_timestamp nvarchar(30), MANDT int, COL1 nvarchar(10), COL2 int, operation nvarchar(1)); ⟵654
CREATE GLOBAL TEMPORARY COLUMN TABLE TRIGGER_COUNT ("IUUC_TRIGGER_COUNT" INTEGER); ⟵656
CREATE SEQUENCE TEST_SEQ RESET BY SELECT IFNULL(MAX(IUUC_SEQUENCE),0)+1 FROM LOGGING1; ⟵658

CREATE TRIGGER TR1_INSERT AFTER INSERT ON SUBJECT REFERENCING NEW ROW NEW FOR EACH ROW
BEGIN ⟵670
    DECLARE iuuc_seq decimal(15); ⟵672
    SELECT TEST_SEQ.nextval INTO iuuc_seq FROM dummy;
    INSERT INTO TRIGGER_COUNT VALUES(1); ⟵674
    INSERT INTO LOGGING2 VALUES(iuuc_seq, to_char(CURRENT_UTCTIMESTAMP,'yyyymmddhh24missFF7'),:NEW."MANDT",:NEW."COL1",:NEW."COL2", 'I'); ⟵676
END; ⟵678
INSERT INTO SUBJECT VALUES ( ?, ? ); -- batch parameters CREATE TRIGGER TR1_UPDATE AFTER UPDATE ON SUBJECT REFERENCING OLD ROW OLD, NEW ROW NEW FOR EACH ROW
BEGIN ⟵666
    DECLARE iuuc_seq decimal(15);
    SELECT TEST_SEQ.nextval INTO iuuc_seq FROM dummy; ⟵684
    INSERT INTO TRIGGER_COUNT VALUES(1);
    INSERT INTO LOGGING1 VALUES(iuuc_seq, to_char(CURRENT_UTCTIMESTAMP,'yyyymmddhh24missFF7'),:OLD."MANDT",:OLD."COL1",:OLD."COL2", 'D'); ⟵680
    INSERT INTO LOGGING2 VALUES(iuuc_seq, to_char(CURRENT_UTCTIMESTAMP,'yyyymmddhh24missFF7'),:NEW."MANDT",:NEW."COL1",:NEW."COL2", 'I'); ⟵682
END;
UPDATE SUBJECT SET COL1 = ? WHERE MANDT = ? ; -- batch parameters ⟵686

CREATE TRIGGER TR1_DELETE AFTER DELETE ON SUBJECT REFERENCING OLD ROW OLD FOR EACH ROW
BEGIN ⟵668
    DECLARE iuuc_seq decimal(15);
    SELECT TEST_SEQ.nextval INTO iuuc_seq FROM dummy; ⟵688
    INSERT INTO TRIGGER_COUNT VALUES(1);
    INSERT INTO LOGGING1 VALUES(iuuc_seq, to_char(CURRENT_UTCTIMESTAMP,'yyyymmddhh24missFF7'),:OLD."MANDT",:OLD."COL1",:OLD."COL2", 'D');
END;
DELETE FROM SUBJECT WHERE MANDT = ? ; -- batch parameters ⟵690

FIG. 6B

TRIGGER EXECUTION FOR TRIGGERS HAVING MULTIPLE INSERT OPERATIONS

FIELD

The present disclosure generally relates to processing of database triggers. Particular implementations relate to techniques for improved processing of triggers having multiple insert operations.

BACKGROUND

Modern database systems are often tasked with processing huge amounts of data. For example, enterprise level database systems commonly have tables with hundreds of individual fields and thousands of rows, or more. A large number of changes can be received for processing in a short period of time, including in situations involving real-time data replication. For example, changes to one database system may be detected and applied to another database system. In the case of a column format (also referred to as a column store) table, modifications, deletions, or insertions may need to be processed on multiple partitions. For example, consider that a new row has been added. In a column store database, this can correspond to an insert operation for each column in the row, where each column corresponds to a partition.

Improving the performance of database operations is an ongoing goal. Thus, for example, it is generally beneficial to implement optimizations when possible. However, particular types of actions such as insert, update, or deletion operations may include logic that causes the operations to be unsuitable for existing optimization techniques. Accordingly, room for improvement exists.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Techniques and solutions are provided for executing database triggers. In particular, disclosed techniques allow for the creation of database triggers with multiple insert statements. For a trigger that includes first and second insert statements, first and second tables are created, respectively for the first and second insert statements, that each include a sequence column. At least the first insert statement references a sequence that is incremented during trigger execution. The sequence columns of the first and second tables have a number of elements corresponding to a number of times a given insert operation will execute as a result of a database operation that satisfies the conditions of the trigger. The first and second insert operations are executed using the respective first and second tables.

In one aspect, the present disclosure provides a process of executing a trigger that includes multiple insert operations. A database trigger definition of a database trigger for a first table is received. The database trigger includes a condition, a first insert operation to be executed when the condition is satisfied, and a second insert operation to be executed when the condition is satisfied. At least the first insert operation references a sequence, the sequence being incremented during trigger execution.

A database operation that satisfies the condition is received. In response to receiving the database operation that satisfies the condition, a second table is generated. The second table includes a first column that includes a first set of sequence values. The first set of sequence values has a number of elements corresponding to a number of times the first insert operation and the second insert operation will be executed as a result of the database operation.

In response to receiving the database operation that satisfies the condition, a third table is generated. The third table includes a second column having a second set of sequence values. The second set of sequence values has a number of elements corresponding to the number of times the first insert operation and the second insert operation will be executed as a result of the database operation. The first insert operation is executed in response to the database operation using the first table. The second insert operation is executed in response to the database operation using the second table.

The present disclosure also includes computing systems and tangible, non-transitory computer readable storage media configured to carry out, or including instructions for carrying out, an above-described method. As described herein, a variety of other features and advantages can be incorporated into the technologies as desired.

BRIEF DESCRIPTION OF THE DRAWINGS

FIG. 6A illustrates example triggers having a single insert operation that can be processed using the technique of FIG. 3, while FIG. 6B illustrates analogous triggers that can be processed using the technique of FIG. 4.

DETAILED DESCRIPTION

Example 1—Overview

Figure 1:
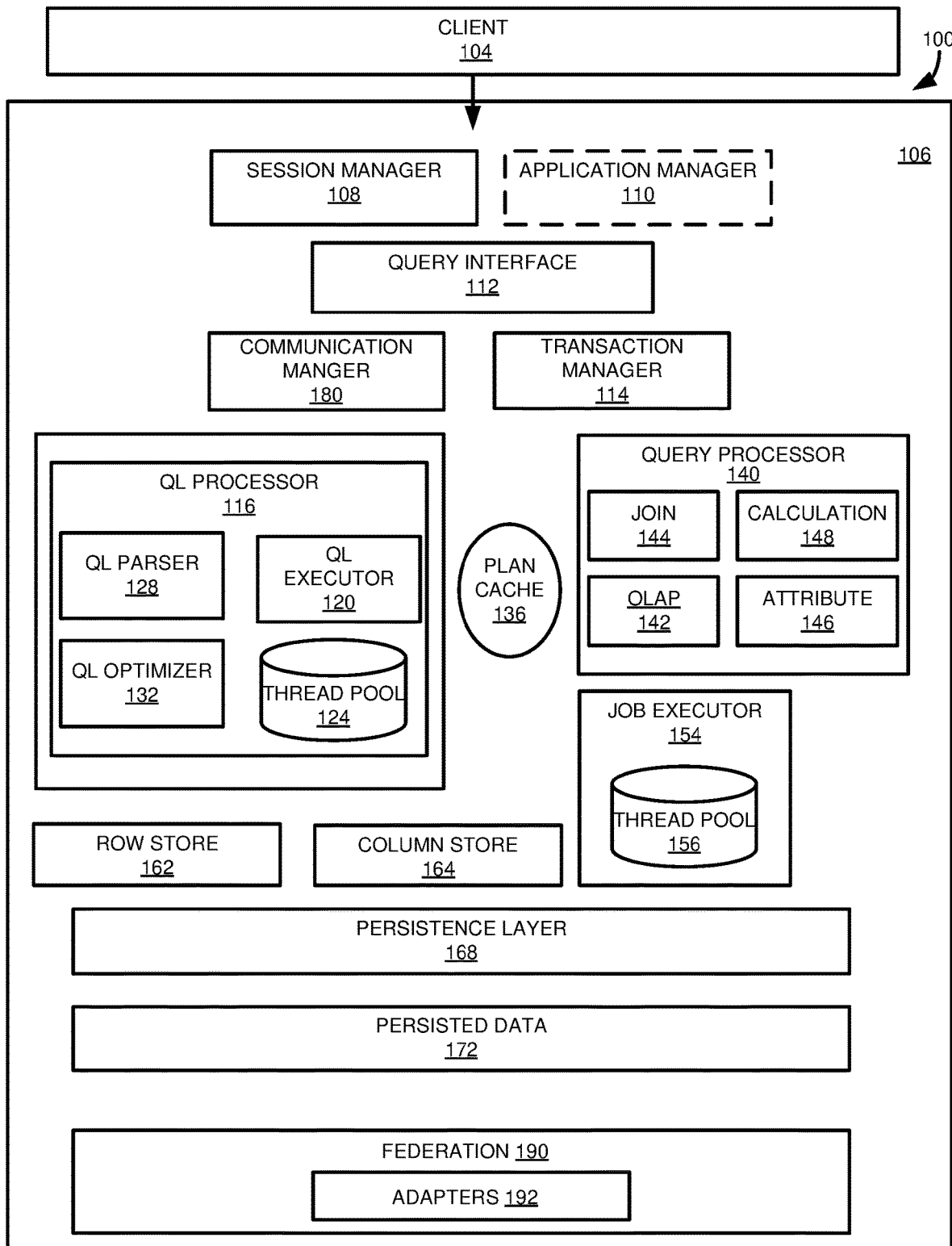
FIG. 1 is a diagram depicting an example database system which can be used in implementing aspects of disclosed technologies.

Modern database systems are often tasked with processing huge amounts of data. For example, enterprise level database systems commonly have tables with hundreds of individual fields and thousands of rows, or more. A large number of changes can be received for processing in a short period of time, including in situations involving real-time data replication. For example, changes to one database system may be detected and applied to another database system. In the case of a column format (also referred to as a column store) table, modifications, deletions, or insertions may need to be processed on multiple partitions. For example, consider that a new row has been added. In a column store database, this can correspond to an insert operation for each column in the row, where each column corresponds to a partition.

Improving the performance of database operations is an ongoing goal. Thus, for example, it is generally beneficial to implement optimizations when possible. However, particular types of actions such as insert, update, or deletion operations may include logic that causes the operations to be unsuitable for existing optimization techniques. Accordingly, room for improvement exists.

Database triggers are an example of particular database functionality that has been the subject of optimization efforts. Processing elements of a database trigger in a serial manner can be extremely time consuming, including the repetitive performance of various steps. However, certain types of operations in a database trigger can preclude the use of optimization techniques.

One optimization technique involves storing insert or update operations in a temporary table instantiated (and deinstantiated) during execution of a trigger. Often, it is desirable to include additional information along with specific values specified for an insertion or an update. Consider, for example, when new data is being inserted into local tables based on a change to data at a remote system. In addition to storing the new values, it may be desirable to store an indicator of when the data was added. Similarly, for updated data, it may be useful to log when an update was made, or to store information about changes made by the update, such as values prior to an update, or storing both new and old values for an update. As another example, if data is added to a table, it may be desirable to add a technical key that is useable to distinguish between table records.

A particular trigger operation has been developed that creates an internal table for data changes. For example, a data change can be an insert or update operation for a column store table. In the case where sequence information is to be added to the inserted or updated data, the internal table can be "pushed down" to a database software layer that carries out updates. In particular, a pointer to the internal table can be pushed down. Pushing down the internal table through the use of the pointer can be helpful for a variety of reasons, including avoiding data copy operations and allowing a single change operation to be sent to the database software layer, rather than serially performing changes. For example, an insert operation can be sent for all columns associated with a single record insert, the data for the insert can be accessed using the pointer for the internal table, and insert operations for the different columns can be parallelized, since the columns are typically treated as different partitions.

In a particular example of the above approach, the addition of a sequence value is specified in a prepared statement for the operations defined in trigger logic of the corresponding trigger. However, this approach may not be suitable in a variety of circumstances, including when trigger logic includes multiple insert operations. One issue that can arise is if more than one internal table needs to be used for the trigger logic. For example, if the trigger logic is for actions to be performed based on an update to a source table, it may be desirable to have one internal table for old values and another internal table for new values. Another issue that can arise is that, if a single sequence is defined, it may not be possible to parallelize execution of operations for the "new values" and the "old values," since executing the operations in parallel would cause both operations to access the same sequence information (which can be implemented as a sequence object, including as in technologies of SAP SE, of Walldorf, Germany), which can cause each process to receive inaccurate sequence information.

The present disclosure addresses these problems by adding a sequence column to each of multiple internal/temporary tables. Prepared statements can be defined for each operation in the trigger logic that involves the use of a temporary table. The temporary tables thus already include the sequence information, which avoid conflicts that might arise if two processes access the same sequence, and allows execution of the different prepared statements to be parallelized.

As used herein a "prepared statement" refers to a precompiled SQL statement that can be parameterized and executed multiple times with different input values, as typically understood in the database arts. A prepared statement includes an SQL template with placeholders for input parameters. These placeholders are usually represented by question marks or named parameters. The template is prepared once and then executed multiple times, allowing different input values to be bound to the parameters.

Example 2 describes an example database system that can be used in implementing disclosed technologies. The database system can be an example of either a local database system where trigger operations are carried out, or a remote database system having objects on which triggers are defined. Example 2 illustrates an example database environment in which disclosed techniques can be implemented. Example 3 illustrates a prior art technique for processing database triggers having a single insert operation, while Examples 4-7 illustrate how disclosed techniques can be used to process database triggers having multiple insert operations.

Example 2—Example Database Architecture

FIG. 1 illustrates an example database environment 100. The database environment 100 can include a client 104. Although a single client 104 is shown, the client 104 can represent multiple clients. The client or clients 104 may be OLAP clients, OLTP clients, or a combination thereof.

The client 104 is in communication with a database server 106. Through various subcomponents, the database server 106 can process requests for database operations, such as requests to store, read, or manipulate data (i.e., CRUD operations). A session manager component 108 can be responsible for managing connections between the client 104 and the database server 106, such as clients communicating with the database server using a database programming interface, such as Java Database Connectivity (JDBC), Open Database Connectivity (ODBC), or Database Shared Library (DBSL). Typically, the session manager 108 can simultaneously manage connections with multiple clients 104. The session manager 108 can carry out functions such as creating a new session for a client request, assigning a client request to an existing session, and authenticating access to the database server 106. For each session, the session manager 108 can maintain a context that stores a set of parameters related to the session, such as settings related to committing database transactions or the transaction isolation level (such as statement level isolation or transaction level isolation).

For other types of clients 104, such as web-based clients (such as a client using the HTTP protocol or a similar transport protocol), the client can interface with an application manager component 110. Although shown as a component of the database server 106, in other implementations, the application manager 110 can be located outside of, but in communication with, the database server 106. The application manager 110 can initiate new database sessions with the database server 106, and carry out other functions, in a similar manner to the session manager 108.

The application manager 110 can determine the type of application making a request for a database operation and mediate execution of the request at the database server 106, such as by invoking or executing procedure calls, generating query language statements, or converting data between formats useable by the client 104 and the database server 106. In particular examples, the application manager 110 receives requests for database operations from a client 104, but does not store information, such as state information, related to the requests.

Once a connection is established between the client 104 and the database server 106, including when established through the application manager 110, execution of client requests is usually carried out using a query language, such as the structured query language (SQL). In executing the request, the session manager 108 and application manager 110 may communicate with a query interface 112. The query interface 112 can be responsible for creating connections with appropriate execution components of the database server 106. The query interface 112 can also be responsible for determining whether a request is associated with a previously cached statement or a stored procedure, and calling the stored procedure or associating the previously cached statement with the request.

At least certain types of requests for database operations, such as statements in a query language to write data or manipulate data, can be associated with a transaction context. In at least some implementations, each new session can be assigned to a transaction. Transactions can be managed by a transaction manager component 114. The transaction manager component 114 can be responsible for operations such as coordinating transactions, managing transaction isolation, tracking running and closed transactions, and managing the commit or rollback of transactions. In carrying out these operations, the transaction manager 114 can communicate with other components of the database server 106.

The query interface 112 can communicate with a query language processor 116, such as a structured query language processor. For example, the query interface 112 may forward to the query language processor 116 query language statements or other database operation requests from the client 104. The query language processor 116 can include a query language executor 120, such as a SQL executor, which can include a thread pool 124. Some requests for database operations, or components thereof, can be executed directly by the query language processor 116. Other requests, or components thereof, can be forwarded by the query language processor 116 to another component of the database server 106. For example, transaction control statements (such as commit or rollback operations) can be forwarded by the query language processor 116 to the transaction manager 114. In at least some cases, the query language processor 116 is responsible for carrying out operations that retrieve or manipulate data (e.g., SELECT, UPDATE, DELETE). Other types of operations, such as queries, can be sent by the query language processor 116 to other components of the database server 106. The query interface 112, and the session manager 108, can maintain and manage context information associated with requests for database operation. In particular implementations, the query interface 112 can maintain and manage context information for requests received through the application manager 110.

When a connection is established between the client 104 and the database server 106 by the session manager 108 or the application manager 110, a client request, such as a query, can be assigned to a thread of the thread pool 124, such as using the query interface 112. In at least one implementation, a thread is associated with a context for executing a processing activity. The thread can be managed by an operating system of the database server 106, or by, or in combination with, another component of the database server. Typically, at any point, the thread pool 124 contains a plurality of threads. In at least some cases, the number of threads in the thread pool 124 can be dynamically adjusted, such in response to a level of activity at the database server 106. Each thread of the thread pool 124, in particular aspects, can be assigned to a plurality of different sessions.

When a query is received, the session manager 108 or the application manager 110 can determine whether an execution plan for the query already exists, such as in a plan cache 136. If a query execution plan exists, the cached execution plan can be retrieved and forwarded to the query language executor 120, such as using the query interface 112. For example, the query can be sent to an execution thread of the thread pool 124 determined by the session manager 108 or the application manager 110. In a particular example, the query plan is implemented as an abstract data type.

If the query is not associated with an existing execution plan, the query can be parsed using a query language parser 128. The query language parser 128 can, for example, check query language statements of the query to make sure they have correct syntax, and confirm that the statements are otherwise valid. For example, the query language parser 128 can check to see if tables and records recited in the query language statements are defined in the database server 106.

The query can also be optimized using a query language optimizer 132. The query language optimizer 132 can manipulate elements of the query language statement to allow the query to be processed more efficiently. For example, the query language optimizer 132 may perform operations such as unnesting queries or determining an optimized execution order for various operations in the query, such as operations within a statement. After optimization, an execution plan can be generated, or compiled, for the query. In at least some cases, the execution plan can be cached, such as in the plan cache 136, which can be retrieved (such as by the session manager 108 or the application manager 110) if the query is received again.

Once a query execution plan has been generated or received, the query language executor 120 can oversee the execution of an execution plan for the query. For example, the query language executor 120 can invoke appropriate subcomponents of the database server 106.

In executing the query, the query language executor 120 can call a query processor 140, which can include one or more query processing engines. The query processing engines can include, for example, an OLAP engine 142, a join engine 144, an attribute engine 146, or a calculation engine 148. The OLAP engine 142 can, for example, apply rules to create an optimized execution plan for an OLAP query. The join engine 144 can be used to implement relational operators, typically for non-OLAP queries, such as join and aggregation operations. In a particular implementation, the attribute engine 146 can implement column data structures and access operations. For example, the attribute engine 146 can implement merge functions and query processing functions, such as scanning columns.

In certain situations, such as if the query involves complex or internally parallelized operations or sub-operations, the query executor 120 can send operations or sub-operations of the query to a job executor component 154, which can include a thread pool 156. An execution plan for the query can include a plurality of plan operators. Each job execution thread of the job execution thread pool 156, in a particular implementation, can be assigned to an individual plan operator. The job executor component 154 can be used to execute at least a portion of the operators of the query in parallel. In some cases, plan operators can be further divided and parallelized, such as having operations concurrently access different parts of the same table. Using the job executor component 154 can increase the load on one or more processing units of the database server 106, but can improve execution time of the query.

The query processing engines of the query processor 140 can access data stored in the database server 106. Data can be stored in a row-wise format in a row store 162, or in a column-wise format in a column store 164. In at least some cases, data can be transformed between a row-wise format and a column-wise format. A particular operation carried out by the query processor 140 may access or manipulate data in the row store 162, the column store 164, or, at least for certain types of operations (such a join, merge, and subquery), both the row store 162 and the column store 164. In at least some aspects, the row store 162 and the column store 164 can be maintained in main memory.

A persistence layer 168 can be in communication with the row store 162 and the column store 164. The persistence layer 168 can be responsible for actions such as committing write transactions, storing redo log entries, rolling back transactions, and periodically writing data to storage to provided persisted data 172.

In executing a request for a database operation, such as a query or a transaction, the database server 106 may need to access information stored at another location, such as another database server. The database server 106 may include a communication manager 180 component to manage such communications. The communication manger 180 can also mediate communications between the database server 106 and the client 104 or the application manager 110, when the application manager is located outside of the database server.

In some cases, the database server 106 can be part of a distributed database system that includes multiple database servers. At least a portion of the database servers may include some or all of the components of the database server 106. The database servers of the database system can, in some cases, store multiple copies of data. For example, a table may be replicated at more than one database server. In addition, or alternatively, information in the database system can be distributed between multiple servers. For example, a first database server may hold a copy of a first table and a second database server can hold a copy of a second table. In yet further implementations, information can be partitioned between database servers. For example, a first database server may hold a first portion of a first table and a second database server may hold a second portion of the first table.

In carrying out requests for database operations, the database server 106 may need to access other database servers, or other information sources, within the database system, or at external systems, such as an external system on which a remote data object is located. The communication manager 180 can be used to mediate such communications. For example, the communication manager 180 can receive and route requests for information from components of the database server 106 (or from another database server) and receive and route replies.

The database server 106 can include components to coordinate data processing operations that involve remote data sources. In particular, the database server 106 includes a data federation component 190 that at least in part processes requests to access data maintained at a remote system. In carrying out its functions, the data federation component 190 can include one or more adapters 192, where an adapter can include logic, settings, or connection information usable in communicating with remote systems, such as in obtaining information to help generate virtual parameterized data objects or to execute requests for data using virtual parameterized data objects (such as issuing a request to a remote system for data accessed using a corresponding parameterized data object of the remote system). Examples of adapters include "connectors" as implemented in technologies available from SAP SE, of Walldorf, Germany. Further, disclosed techniques can use technologies underlying data federation techniques such as Smart Data Access (SDA) and Smart Data Integration (SDI) of SAP SE.

Figure 2:
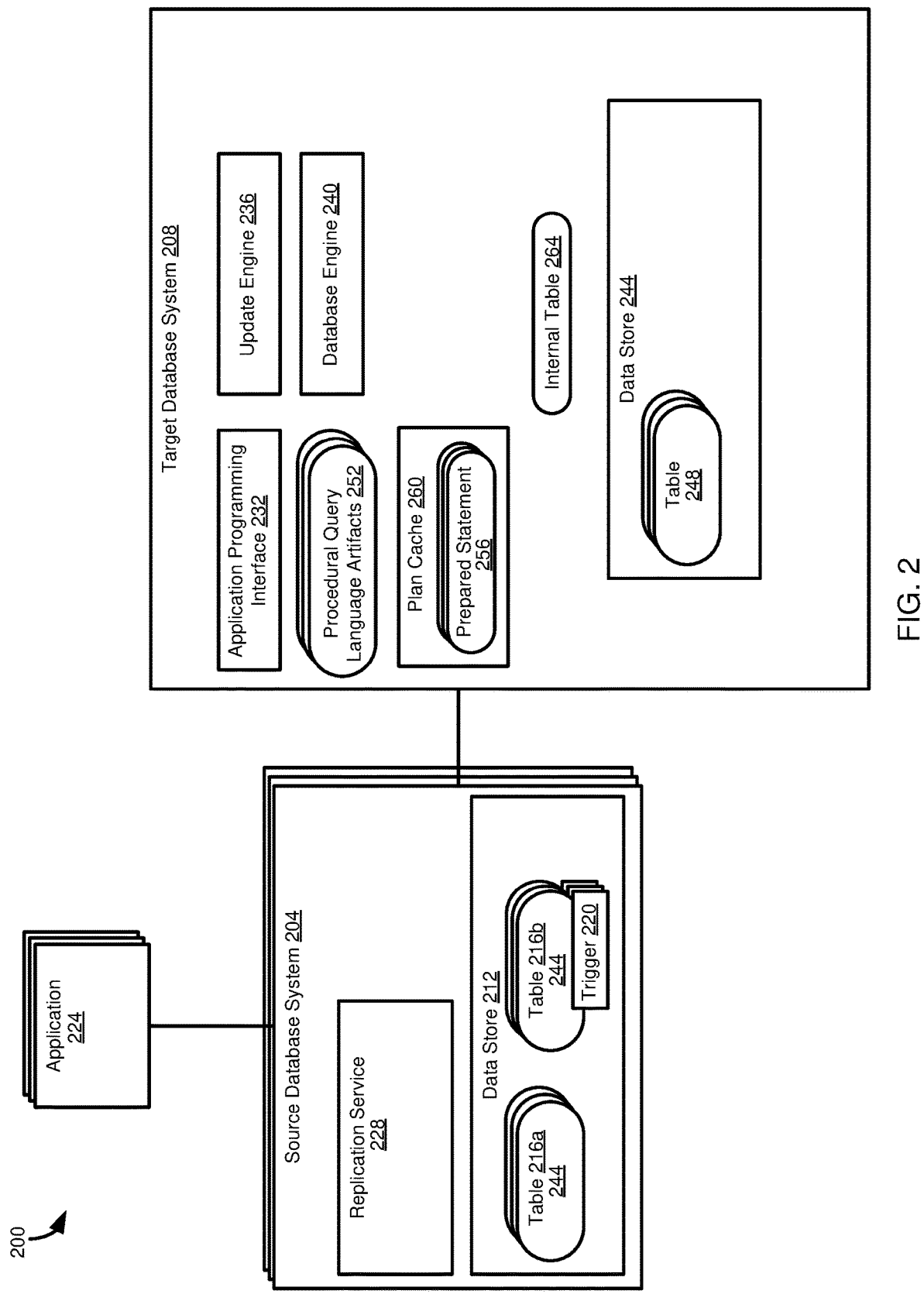
FIG. 2 is a diagram depicting a computing environment in which disclosed techniques can be implemented, including illustrating how changes to data at a source system can be applied to data at another system using triggers.

Example 3—Example Computing Environment for Performing Data Manipulation Operations at a Target System Based on Data Manipulation Operations at a Source System FIG. 2 illustrates a computing environment 200 in which disclosed technologies can be implemented. The computing environment 200 includes a source database system 204 and a target database system 208. The scenario of the computing environment 200 includes replicating data from the source database system 204 to the target database system 208.

The source database system 204 includes a data store 212 that stores data in a plurality of objects (such as different instances of a particular object type, such as an object type representing a relational database table). Although other object types can be used, for purposes of explanation the object types are shown as relational database tables 216a, 216b. Respective triggers 220 are defined for databases tables 216b, while triggers are not defined for database tables 216a. In some cases, triggers can be defined for all tables in the data store 212, or for a particular database model/schema of the data store. In that event, the data store 212 can omit tables 216a.

Changes to the tables 216b can be made, such as in response to commands received from one or more applications 224. Changes can be in the form of data to be added, data to be modified, or existing data to be deleted. Triggers 220 can be defined for one or more of these operations for any given table 216b. For example, one trigger 220 may be defined for an update to a table 216b, while another trigger may be defined for an insert operation on the table.

A replication service 228 can cause the propagation of change information to the target database system 208. The replication service 228 can communicate with the target database system 208 through an application programming interface 232 of the target database system. In a specific example, the target database system 208 is a HANA database system of SAP SE, of Walldorf Germany, and the application programming interface 232 is the EAPI (Enterprise Application Integration) interface of SAP. Changes (inserts, updates, or deletes) received through the application programming interface 232 can be processed using an update engine 236. In a specific example, the update engine 236 is the HANA UPdate Engine (HUP) use in technologies of SAP SE.

The update engine 236 in turn can call functionality of a database engine 240, such as the HANA database engine of SAP SE. In turn, the database engine 240 can make changes to data stored in a data store 244 of the target database system 208, such as making changes to tables 248 of the data store.

To help improve performance of the target database system 208, the target database system can include additional components, such as procedural query language artifacts 252. An example of a procedural query language artifact 252 is a prepared statement 256. Procedural query language artifacts 252 can be defined in a programming language, such as SQLSCRIPT of SAP SE. The prepared statements 256 are shown as being maintained in a plan cache 260 The prepared statements 256 can be maintained or registered in the plan cache 260, and can be accessed during the processing of change operations (such as by the update engine 236).

Processing of change operations can also be facilitated by the use of internal tables 264 (which can also be referred to as temporary tables). Internal tables 264 are typically created dynamically during the processing of database operations, such as in carrying out read, insert, or update requests. The internal tables 264 are typically created in memory.

Data changes can be processed using disclosed techniques, but using different components of the target database system 208, or at least using the components in a different order/different manner. For example, in a particular example, the replication service 228 can directly access the update engine 236 of the target database system 208. In a particular implementation, the source database system 204 is an instance of the SAP Inventory Collaboration Hub (SAP ICH) of SAP. In this example, an application 224 can be another database system. For example, an insert operation on data associated with a database application of another computing system can cause the tables 216b to be changed, and the replication service 238 (in this case, a component of SAP ICH) can directly access the update engine 236 to initiate updates to the tables 248 of the data store 244 of the target database system 208.

The use of the various components of the computing environment 200 will be further described as the specification proceeds. However, disclosed techniques can be used in scenarios that differ from that shown in the computing environment 200. For example, in some cases, disclosed trigger processing techniques can be used with triggers defined and processed within a single database system. That is, the table on which a trigger is defined can be in the same database system as tables that are the subject of insert operations defined within the trigger.

Figure 3:
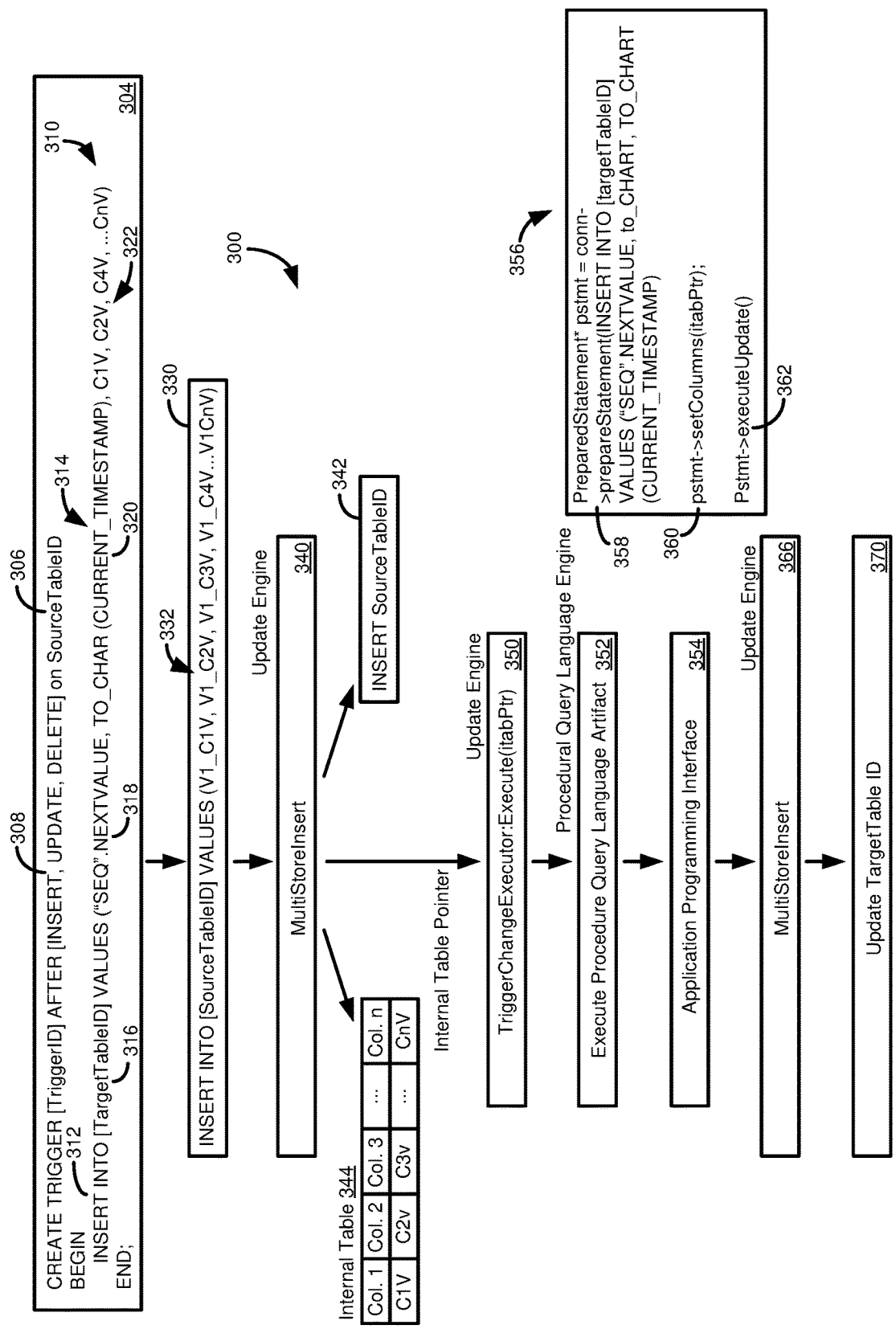
FIG. 3 is a diagram illustrating a prior art process for executing triggers having a single insert operation.

Example 4—Example Technique for Processing Triggers with a Single Insert Operation To assist in understanding improvements provided by the disclosed innovations, a prior change implementation process 300 is depicted in FIG. 3.

The process 300 involves a trigger 304 that is defined on a specified source table 306 (or other data source). The trigger 304 can be defined with respect to a particular operation 308 on the specified source table 306. For the purposes of the process 300, consider that the operation 308 for the process is an insert operation.

The trigger 304 includes trigger logic 310. In this case, the trigger logic 310 includes a single operation 312. The operation 312 specifies particular attributes 314 for which values will be inserted in a specific target table 316 once the trigger conditions are met. In this case, the attributes 314 include a next occurring value 318 in a specified sequence, a timestamp 320, as well as attributes 322, which can correspond to values provided in an insert operation that fires the trigger 304 (for example, column values specified in an INSERT statement for the source table 306).

Now, consider an operation 330 performed on the source table 306. In this particular example, the operation 330 is an insert operation. The operation 330 satisfies the condition/operation 308. Consider that the insert operation 330 provides values 332 specified for the attributes 322.

In response to receiving the operation 330, the data changes of the operation can be applied to the source table 306. The trigger 304 is fired, which causes an insert operation for the trigger to be initiated at 340. In this case, the operation at 340 is shown as a MultiStoreInsert operation, as implemented in technologies of SAP SE. A MultiStoreInsert operation can cause insert operations for the attributes 320 to be parallelized, such as having concurrent insert operations for each attribute, where each attribute can be associated with a different column partition of a table (such as a table 248 of the computing environment 200). The changes to the source table are made at 342.

The operation 340 also causes the generation of an internal table 344. The internal table 344 can have the attributes and values as specified in the operation 312, or can have values resulting from operations performed at 342. For example, when the condition 308 is an update operation, the internal table 344 can include old values of the source table 306 prior to the update, new values of the source table prior to the update, or both old and new values.

A pointer for the internal table is passed to a trigger executor component, which executes the trigger at 350, such as by calling a procedural query language execution engine at 352. In a specific example, the trigger executor component associated with the operations at 350 can be functionality provided by the update engine 236 of FIG. 2. Executing the trigger at 352 can include calling an application programming interface, such as the application programming interface 232 of FIG. 2, which then executes at 354. In a particular example, a stored procedure is defined for the trigger logic 310, in particular corresponding to the operation 312. At 354, the application programming interface can perform the operations shown in panel 356.

The operations in the panel 356 include, at 358, defining a pointer to a prepared statement, when the pointer is set to point to a preparedStatement defined with respect to a connection object (such as a database connection object, such as implemented in technologies of SAP SE). The connection object can be used to interact with a database, such as interacting with the data store 244 of FIG. 2, during trigger execution. The connection object can include methods to execute SQL statements, fetch results, or manage transactions. The panel 356 further includes an operation 360 that creates columns for the prepared statement. The operation 360 takes the pointer value for the internal table as an argument, and causes the prepared statement to use the columns that are defined for the internal table. Operation 362 causes the prepared statement to be executed.

The operations at 354 result in the execution of an insert operation, such as by the update engine 236 of FIG. 2, executed at 366. The insert operation at 366 can be a multistore insert operation. The operations of the update engine at 366 cause the target table of the trigger logic 310 to be updated at 370, as by using the database engine 240 of FIG. 2.

Figure 4:
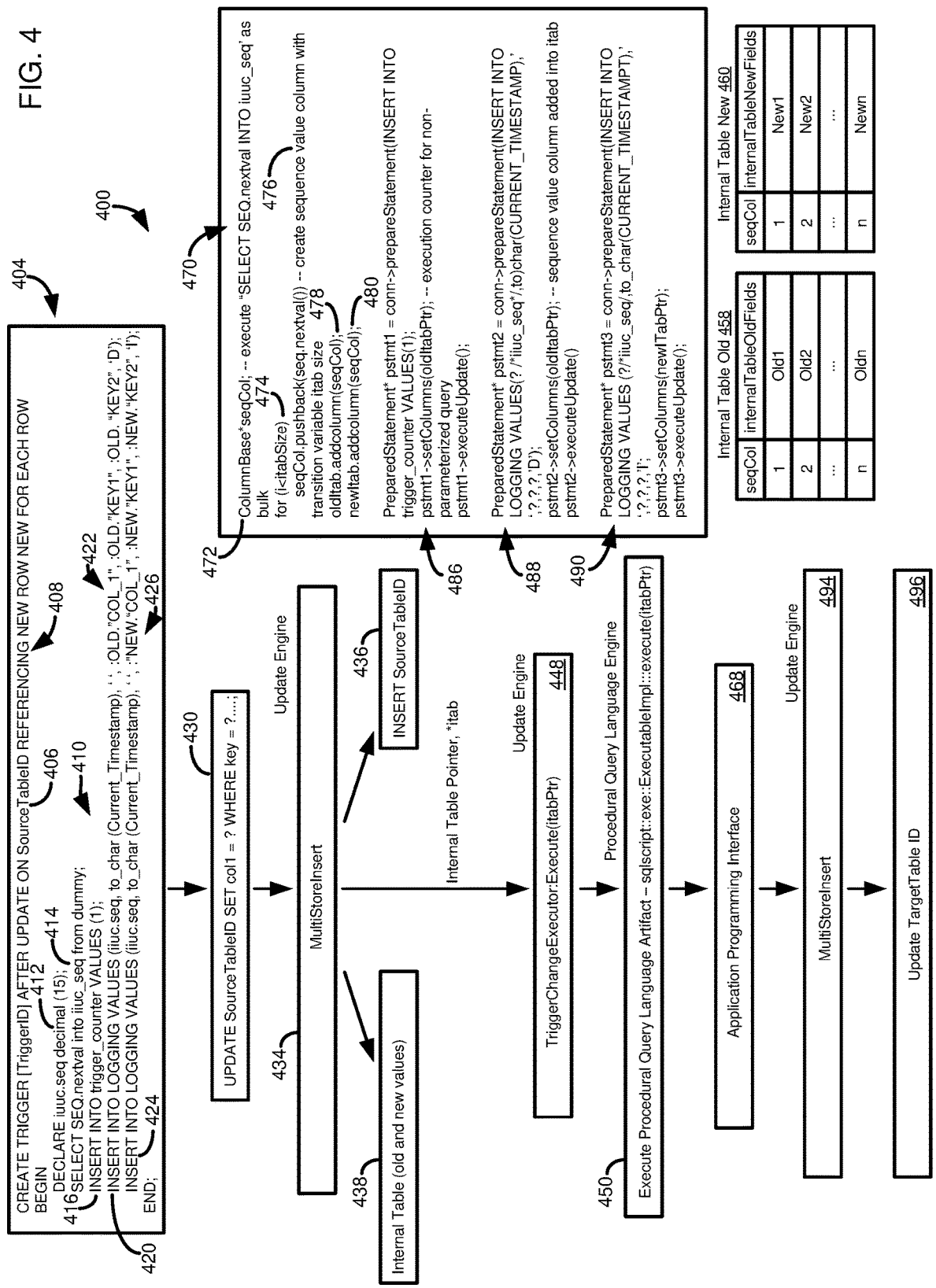
FIG. 4 is a diagram illustrating a technique of the present disclosure for executing triggers having multiple insert operations.

Example 5—Example Techniques for Processing Triggers Having Multiple Insert Operations FIG. 4 is a flowchart of a process 400 of processing triggers using innovations of the present disclosure. The process 400 includes a trigger definition 404. The trigger definition 404 is defined on a source table 406, in particular when an update is performed on the source table. The trigger definition 404 includes a specification 408 that the trigger will reference newly inserted or updated rows, and the "NEW" following "NEW ROW" serves as an alias to a newly updated or inserted row. The "FOR EACH ROW" portion of the trigger definitions will cause an update to be performed for each affected row. In this case, NEW ROW serves to override a default alias of NEW for the new row and, as an alias for the old version of the row is not specified, the old version of the row can be accessed using the default "OLD" alias.

The trigger 404 includes a trigger definition 410. The trigger definition 410 includes a number of statements, includes the declaration 412 of an incremental unique user counter, "iuuc.seq." A selection operation 414 obtains a next value in the sequence (where "dummy" acts as placeholder table, not storing data, that allows the operation 414 to conform with standard SQL structure). An operation 416 inserts the value of "1" into a trigger_counter table. The operation 416 can be used to track how many records were affected by an update operation on the source table 406.

While the trigger 304 included a single insert operation, the trigger 404 includes two additional insert operations, operations 420, 424. Insert operation 420 inserts values 422 into a logging table, "LOGGING": a current sequence value, a current time stamp, a value for a column, "COL_1", of an old version of a row associated with an update operation, values of the prior row version for the "KEY1" and "KEY2" columns, and a value of "D" (which can indicate that the record of the insert corresponds to a deletion operation on the source table 406). The insert operation 424 is similar to the insert operation 420, inserting values 426, but uses values for "COL_1", "KEY1", and "KEY2" from the new version of the row. Instead of a value of "D", a value of "I" is inserted, indicating that the record of the insert corresponds to an insert operation on the source table 406.

Now, assume that an update operation 430 is executed against the source table 406. The update operation 430 causes the initiation of an insert operation at 434, which can be a multistore insert operation, as for the insert operation 340 of FIG. 3. The insert operation can cause the source table 406 to be updated at 436.

An internal table 438 can be created as a result of the multistore insert operation 434. The internal table 438 can have both prior values for a given record of the source table 406 and new values for the given record of the source table. The internal table 438 can be defined to separately identify old and new records (such as a column that indicates an added record or a deleted record), or can be associated with logic (such a method of a class that implements an internal table) that can provide selective access to old values or new values.

The multistore insert operation at 434 can pass a pointer to the internal table 438 to a trigger executor, which initiates trigger execution at 448, and which in turn can cause a procedural query language engine to execute an implementation ("ExectuableImpl") defined for the trigger at 450. That is, a procedural query object, such as a SQLSCRIPT object, can store logic for a particular trigger. In the case of the process 400, the trigger logic can include logic to create separate internal tables 458, 460 storing, respectively, old values (itabOld) and new values(itabNew) extracted from the internal table 438.

The trigger logic can also call an application programming interface to perform additional processing at 468. The additional processing at 468 can include operations shown in a panel 470. An operation 472 causes a pointer to a column, "seqCol" to be generated. Operations 474, 476 define a loop that adds values to the sequence column according to the sequence ("SEQ", where ".nextval" obtains the next value in the sequence) identified in the trigger definition 410, where values are added based on the size of the internal table (where the size function for the internal table can correspond to a number of updated rows, as opposed to both rows associated with an insert portion of an update and rows associated with a delete portion of the update). The sequence column is added to both the internal table with prior values 458, oldItab, and the internal table with new values 460, newItab, in operations 478, 480. Note that this results in sequence information being independently stored for old and new values, as opposed to the process 300 of FIG. 3, where the sequence values were not stored in an internal table.

The panel 470 defines operations 486, 488, 490, corresponding to the three insert operations 416, 420, 424 of the trigger definition 410. The operations 486, 488, 490 are generally similar to the operations 358, 360, 362 of FIG. 3, in that they involve the definition of a pointer to a prepared statement based on a connection object, setting columns for the prepared statement based on an internal table (depending on whether a respective prepared statement is dealing with old or new values, or where it does not matter, such as when a total number of updates is being tracked), and then causing the prepared statement to be executed. Note that the insert statements for the operations 488, 490 now refer to the sequence column of a respective old or new internal table, rather than directly referring to a sequence object (indicated by the comment "/*iiuc_seq*/").

The process 400 then continues in a similar manner as the operations 366, 370 of the process 300, where a multistore insert operation is generated at 494, and the tables that are the targets of the insert operations 416, 420, 424 are updated at 496.

Figure 5:
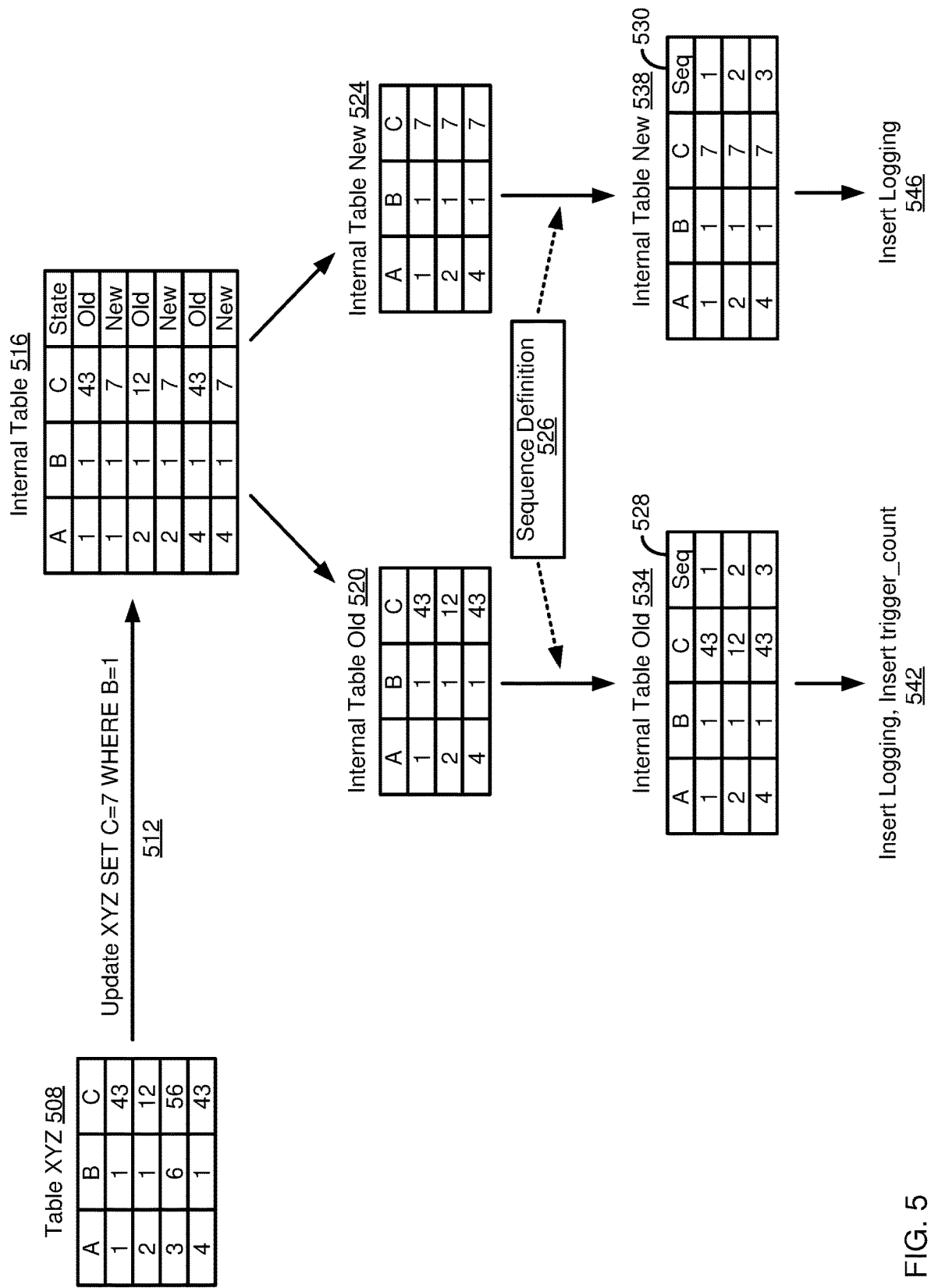
FIG. 5 is a diagram providing a particular example of the technique illustrated in FIG. 4.

FIG. 5 provides additional information to help explain the process 400 of FIG. 4. In particular, FIG. 5 illustrates a table 508, which can be the subject of a trigger, such as the trigger 404, or a trigger analogous thereto. An update operation 512 is received for the table 508, which causes the contents of the table to be modified as specified in the update operation.

Performing the update operation 512 results in the production of an internal (temporary) table 516, which stores, for rows that satisfy the update operation, old values of an updated row and new values of an updated row. The internal table 516 can correspond to the internal table 438 of FIG. 4. The definition of an internal table 516 can be such that old values or new values can be selectively retrieved. Thus, the internal table 516 can be used to generate an internal table 520 that contains old values and an internal table 524 that contains new values.

According to techniques of the present disclosure, sequence information from a sequence definition 526 (such as a sequence defined in a sequence object) can be used to append sequence columns 528, 530 to internal tables 520, 524, respectively, to generate internal tables 534, 538. The internal tables 534, 538 can correspond to the internal tables 458, 460 of FIG. 4. Trigger operations 542, 546, corresponding to the actions defined in the trigger 404, can then be performed on the tables targeted by the insertion statements in the trigger, using the internal tables 534, 538.

As has been described, including the sequence columns 528, 530 in the internal tables 534, 538 allows trigger operations to be parallelized, as compared with a trigger processed directly using a specified sequence.

Example 6—Example Triggers with Different Types of Trigger Conditions Having a Single Insert Statement and Analogous Triggers Having Multiple Insert Statements FIG. 6A illustrates insert, update, and delete scenarios that could be handled using prior trigger optimization techniques, while FIG. 6B illustrates generally similar triggers as FIG. 6A, but with modifications that would make them unsuitable for use with trigger optimization techniques, but which can be processed using disclosed techniques.

In FIG. 6A, operation 608 creates a table, "SUBJECT", as a column store table, with three attributes (MANDT, COL1, COL2). Operation 610 creates a table, "LOGGING", which is also a column store table and includes five attributes (generally, a sequence column, a timestamp column, a MANDT column, and columns COL1 and COL2).

FIG. 6A illustrates various triggers 616, 618, 620 that can be defined on the SUBJECT table (thus being the source table), and which cause operations to be performed on the LOGGING table (thus being the target table). The conditions of the triggers 616, 618, 620 are, respectively, an insert operation, and update operation, and a delete operation. Note that the triggers 616, 618, 620 each include a single insert operation on the target table, and only a single sequence object ("SEQ") is used in a given trigger.

FIG. 6B includes an operation 650 that creates a SUBJECT table, which corresponds to the SUBJECT table created by operation 608 of FIG. 6A. In this case two logging tables, LOGGING1 and LOGGING2, are defined by respective operations 652, 654, but where each operation has a similar format as the operation 610 of FIG. 6A.

FIG. 6B also includes an operation 656 to create a global temporary table (in column store format) with the identifier "TRIGGER_COUNT", having a single column. An operation 658 creates a sequence object, "TEST_SEQ". The sequence object starts from the higher of 1 or one integer value higher than a current sequence value associated with the LOGGING1 table.

FIG. 6B illustrates triggers 664, 666, 668, that correspond to a trigger condition of an insert, update, or delete on the SUBJECT table (which thus serves as a source table for the trigger). The trigger 664 includes a sequence variable declared at operation 670, and provides values for the sequence according to operation 672, using the sequence object created in operation 658. The trigger 664 includes a constant insertion operation 674, as well as an insertion operation 676 of values into the LOGGING2 table.

In prior optimization techniques, the insert operations 674, 676 would typically be performed serially, since the insert operation 676 does not "know" how many values were inserted by the insert operation 674, at least until after the insert operation 674 is performed. The trigger 664 can be processed using functionality analogous to that described with respect to the panel 470 of FIG. 4. That is, the size (number of records) of an internal table that holds the insertion information can be determined. Sequence columns can be added to the internal table to provide separate internal tables for the insert operations 674, 676, and then prepared statements for the insert operations can be executed using the modified internal tables. Thus, the insert operation 674, 676 can be executed in parallel for each inserted record. FIG. 6B illustrates an example insert operation 678 on the SUBJECT table that causes the trigger 664 to be processed.

The trigger 666 is generally analogous to the trigger 618 discussed with respect to FIG. 4. A difference is that the trigger 666 includes insert operations 680, 682 for the LOGGING1 and LOGGING2 tables, corresponding respectively to old and new values, rather than having an operation 630 that inserts old and new values into the same table. Otherwise, the trigger 666 can be processed as discussed with respect to FIG. 4, including process an insert operation 684 that inserts a constant value. Operation 686 is an example update operation on the SUBJECT table that causes the trigger 666 to be processed.

The trigger 668 is generally similar to the trigger 664, but records old values to the LOGGING1 table upon a deletion, rather than also recording new values to the LOGGING2 table in response to an update. The trigger 668 also includes a constant insert operation 688 that is analogous to the operation 674. Otherwise, the operation and benefits of the trigger 668 are analogous to the description of the triggers 664, 666. Operation 686 is an example delete operation on the SUBJECT table that causes the trigger 668 to be processed.

Figure 7:
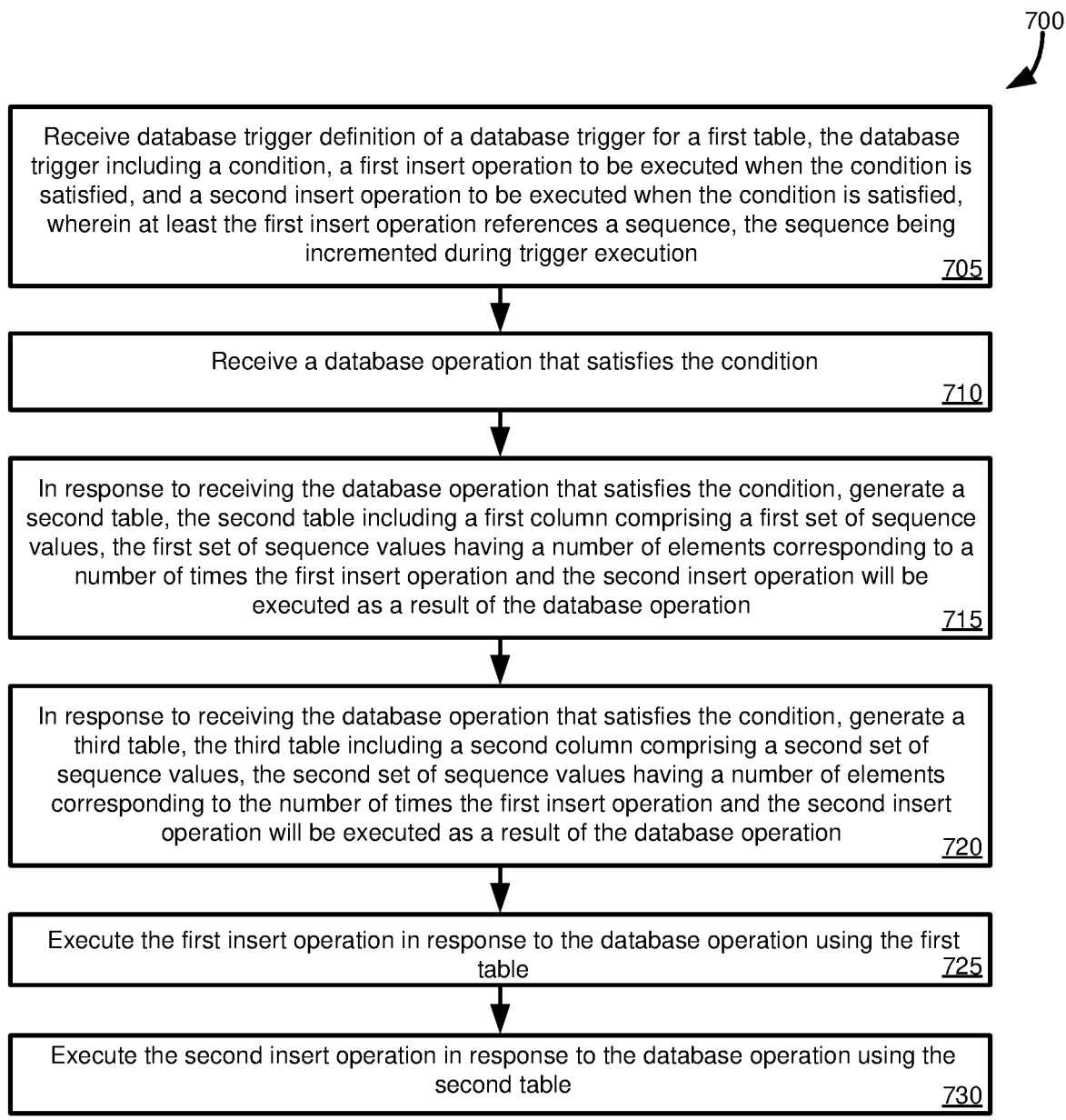
FIG. 7 is a flowchart of a process of executing a database trigger that includes multiple insert operations, at least one of which references a sequence that is incremented during trigger execution.

Example 7—Example Operations in Executing Triggers with Multiple Insert Operations FIG. 7 is a flowchart of a process 700 of executing a trigger that includes multiple insert operations. At 705, a database trigger definition of a database trigger for a first table is received. The database trigger includes a condition, a first insert operation to be executed when the condition is satisfied, and a second insert operation to be executed when the condition is satisfied. At least the first insert operation references a sequence, the sequence being incremented during trigger execution.

A database operation that satisfies the condition is received at 710. At 715, in response to receiving the database operation that satisfies the condition, a second table is generated. The second table includes a first column that includes a first set of sequence values. The first set of sequence values has a number of elements corresponding to a number of times the first insert operation and the second insert operation will be executed as a result of the database operation.

In response to receiving the database operation that satisfies the condition, at 720, a third table is generated. The third table includes a second column having a second set of sequence values. The second set of sequence values has a number of elements corresponding to the number of times the first insert operation and the second insert operation will be executed as a result of the database operation. At 725, the first insert operation is executed in response to the database operation using the first table. At 730, the second insert operation is executed in response to the database operation using the second table.

Example 8—Computing Systems

Figure 8:
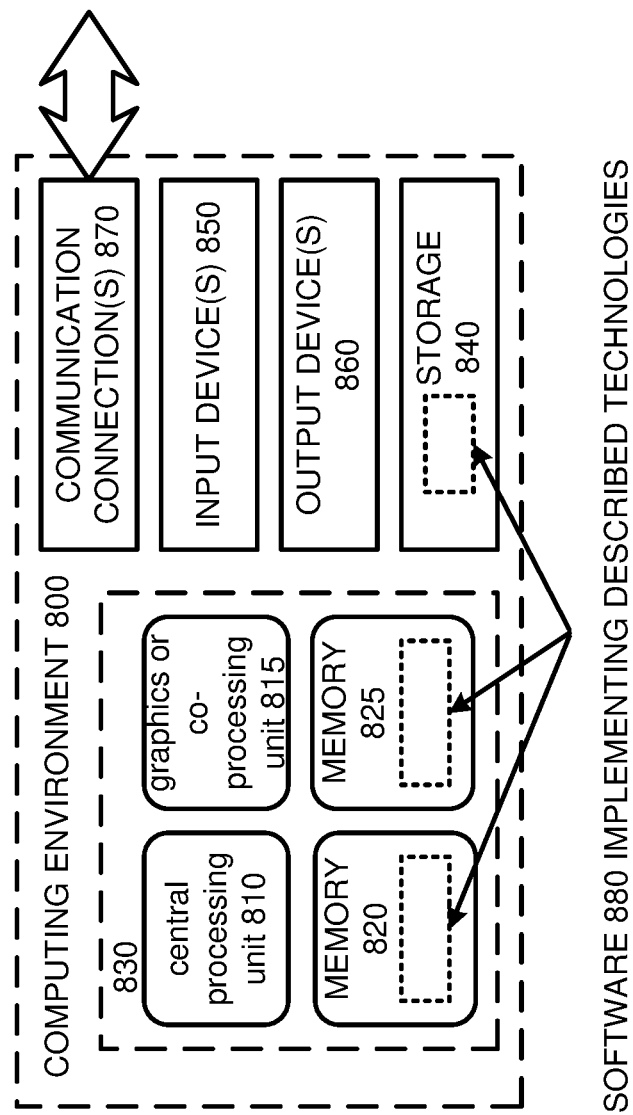
FIG. 8 is a diagram of an example computing system in which some described embodiments can be implemented.

FIG. 8 depicts a generalized example of a suitable computing system 800 in which the described innovations may be implemented. The computing system 800 is not intended to suggest any limitation as to scope of use or functionality of the present disclosure, as the innovations may be implemented in diverse general-purpose or special-purpose computing systems.

With reference to FIG. 8, the computing system 800 includes one or more processing units 810, 815 and memory 820, 825. In FIG. 8, this basic configuration 830 is included within a dashed line. The processing units 810, 815 execute computer-executable instructions, such as for implementing a database environment, and associated methods, described in Examples 1-7. A processing unit can be a general-purpose central processing unit (CPU), a processor in an application-specific integrated circuit (ASIC), or any other type of processor. In a multi-processing system, multiple processing units execute computer-executable instructions to increase processing power. For example, FIG. 8 shows a central processing unit 810 as well as a graphics processing unit or co-processing unit 815. The tangible memory 820, 825 may be volatile memory (e.g., registers, cache, RAM), nonvolatile memory (e.g., ROM, EEPROM, flash memory, etc.), or some combination of the two, accessible by the processing unit(s) 810, 815. The memory 820, 825 stores software 880 implementing one or more innovations described herein, in the form of computer-executable instructions suitable for execution by the processing unit(s) 810, 815.

A computing system 800 may have additional features. For example, the computing system 800 includes storage 840, one or more input devices 850, one or more output devices 860, and one or more communication connections 870. An interconnection mechanism (not shown) such as a bus, controller, or network interconnects the components of the computing system 800. Typically, operating system software (not shown) provides an operating environment for other software executing in the computing system 800, and coordinates activities of the components of the computing system 800.

The tangible storage 840 may be removable or non-removable, and includes magnetic disks, magnetic tapes or cassettes, CD-ROMs, DVDs, or any other medium which can be used to store information in a non-transitory way, and which can be accessed within the computing system 800. The storage 840 stores instructions for the software 880 implementing one or more innovations described herein.

The input device(s) 850 may be a touch input device such as a keyboard, mouse, pen, or trackball, a voice input device, a scanning device, or another device that provides input to the computing system 800. The output device(s) 860 may be a display, printer, speaker, CD-writer, or another device that provides output from the computing system 800.

The communication connection(s) 870 enable communication over a communication medium to another computing entity, such as another database server. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules or components include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Example 9—Cloud Computing Environment

Figure 9:
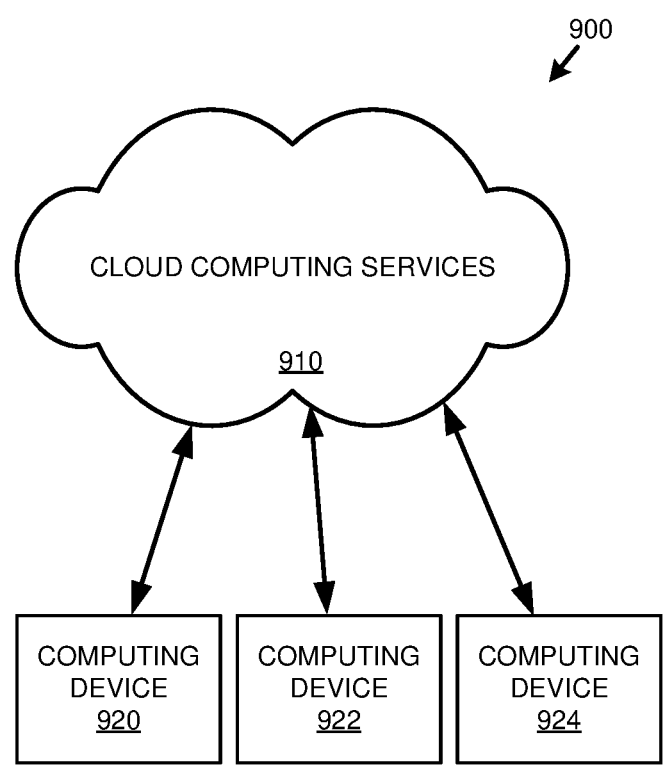
FIG. 9 is an example cloud computing environment that can be used in conjunction with the technologies described herein.

FIG. 9 depicts an example cloud computing environment 900 in which the described technologies can be implemented. The cloud computing environment 900 comprises cloud computing services 910. The cloud computing services 910 can comprise various types of cloud computing resources, such as computer servers, data storage repositories, networking resources, etc. The cloud computing services 910 can be centrally located (e.g., provided by a data center of a business or organization) or distributed (e.g., provided by various computing resources located at different locations, such as different data centers and/or located in different cities or countries).

The cloud computing services 910 are utilized by various types of computing devices (e.g., client computing devices), such as computing devices 920, 922, and 924. For example, the computing devices (e.g., 920, 922, and 924) can be computers (e.g., desktop or laptop computers), mobile devices (e.g., tablet computers or smart phones), or other types of computing devices. For example, the computing devices (e.g., 920, 922, and 924) can utilize the cloud computing services 910 to perform computing operators (e.g., data processing, data storage, and the like).

Example 10—Implementations

Although the operations of some of the disclosed methods are described in a particular, sequential order for convenient presentation, it should be understood that this manner of description encompasses rearrangement, unless a particular ordering is required by specific language set forth herein. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media, such as tangible, non-transitory computer-readable storage media, and executed on a computing device (e.g., any available computing device, including smart phones or other mobile devices that include computing hardware). Tangible computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). By way of example and with reference to FIG. 8, computer-readable storage media include memory 820 and 825, and storage 840. The term computer-readable storage media does not include signals and carrier waves. In addition, the term computer-readable storage media does not include communication connections (e.g., 870).

Any of the computer-executable instructions for implementing the disclosed techniques, as well as any data created and used during implementation of the disclosed embodiments, can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Python, Ruby, ABAP, Structured Query Language, Adobe Flash, or any other suitable programming language, or, in some examples, markup languages such as html or XML, or combinations of suitable programming languages and markup languages. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present, or problems be solved.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

What is claimed is:

1. A computing system comprising:
   at least one memory;
   one or more hardware processor units coupled to the at least one memory; and
   one or more computer readable storage media storing computer-executable instructions that, when executed, cause the computing system to perform operations comprising:
      defining a database trigger definition of a database trigger for a first table in a first computing language, the database trigger definition comprising a condition, a first insert operation, defined in a second computing language, to be executed when the condition is satisfied, and a second insert operation, defined in a third computing language, to be executed when the condition is satisfied, wherein the first computing language, the second computing language, and the third computing language are the same or where one or more differ, and wherein at least the first insert operation references a sequence, the sequence being incremented during trigger execution;
      receiving a database operation for the first table;
      determining that the database operation for the first table satisfies the condition, thus activating the database trigger;
      in response to determining that the database operation that satisfies the condition, generating a second table, the second table comprising a first column comprising a first set of sequence values, the first set of sequence values having a number of elements corresponding to a number of times the first insert operation and the second insert operation will be executed as a result of the database operation;
      in response to determining that the database operation for the first table satisfies the condition, generating a third table, the third table comprising a second column comprising a second set of sequence values, the second set of sequence values having a number of elements corresponding to the number of times the first insert operation and the second insert operation will be executed as a result of the database operation;
      executing the first insert operation in response to the database operation using the first table a number of times indicated by the first set of sequence values; and
      executing the second insert operation in response to the database operation using the second table a number of times indicated by the second set of sequence values;
      wherein the first set of sequence values and the second set of sequence values allow multiple insert operations to be performed using a single database trigger, providing improved computing efficiency compared to executing the first insert operation and the second insert operations using separate triggers.

2. The computing system of claim 1, wherein executing the first insert operation and executing the second insert operation are performed in parallel.

3. The computing system of claim 1, the operations further comprising:
   generating a first prepared statement corresponding to the first insert operation;

generating a second prepared statement corresponding to the second insert operation;

executing the first prepared statement using the second table; and executing the second prepared statement using the third table.

4. The computing system of claim 3, wherein executing the first prepared statement using the second table comprises providing a pointer to the second table when the first prepared statement is called and executing the second prepared statement using the third table comprises providing a pointer to the third table when the second prepared statement is called.

5. The computing system of claim 3, wherein the executing the first prepared statement and the executing the second prepared statement are carried out in parallel.

6. The computing system of claim 3, wherein the executing the first prepared statement is carried out independently of the executing the second prepared statement.

7. The computing system of claim 1, wherein the second table comprises values received in the database operation and the first column is appended to a table comprising the values to provide the second table.

8. The computing system of claim 1, wherein the database operation is an update operation and:

the second table is formed by appending the first column to a table comprising old values of the first table; and the third table is formed by appending the second column to a table comprising new values of the first table.

9. The computing system of claim 1, wherein the first insert operation inserts a specified value each time the first insert operation is executed during trigger execution carried out in response to the database operation.

10. The computing system of claim 1, wherein the condition is an update operation performed against the first table.

11. The computing system of claim 1, wherein the condition is an insert operation performed against the first table.

12. The computing system of claim 1, wherein the condition is a delete operation performed against the first table.

13. The computing system of claim 1, wherein the first table is in a column store format.

14. The computing system of claim 1, wherein the sequence is defined at least in part using a sequence object defined outside of the database trigger.

15. The computing system of claim 1, wherein the second table and the third table are temporary tables.

16. The computing system of claim 1, the operations further comprising:

determining a size of a table storing results of executing the database operation;

generating a number of sequence values according to the size; and providing the number of sequence values as values for elements of the number of elements of the second table and as values for elements of the number of elements of the third table.

17. A method, implemented in a computing system comprising at least one hardware processor and at least one memory coupled to the at least one hardware processor, the method comprising:

defining a database trigger definition of a database trigger for a first table in a first computing language, the database trigger definition comprising a condition, a first insert operation, defined in a second computing language, to be executed when the condition is satisfied, and a second insert operation, defined in a third computing language, to be executed when the condition is satisfied, wherein the first computing language, the second computing language, and the third computing language are the same or where one or more differ, and wherein at least the first insert operation references a sequence, the sequence being incremented during trigger execution;

receiving a database operation for the first table;

determining that the database operation for the first table satisfies the condition, thus activating the database trigger;

in response to determining that the database operation satisfies the condition, generating a second table, the second table comprising a first column comprising a first set of sequence values, the first set of sequence values having a number of elements corresponding to a number of times the first insert operation and the second insert operation will be executed as a result of the database operation;

in response to determining that the database operation for the first table satisfies the condition, generating a third table, the third table comprising a second column comprising a second set of sequence values, the second set of sequence values having a number of elements corresponding to the number of times the first insert operation and the second insert operation will be executed as a result of the database operation;

executing the first insert operation in response to the database operation using the first table a number of times indicated by the first set of sequence values; and executing the second insert operation in response to the database operation using the second table a number of times indicated by the second set of sequence values;

wherein the first set of sequence values and the second set of sequence values allow multiple insert operations to be performed using a single database trigger, providing improved computing efficiency compared to executing the first insert operation and the second insert operations using separate triggers.

18. The method of claim 17, further comprising:

generating a first prepared statement corresponding to the first insert operation;

generating a second prepared statement corresponding to the second insert operation;

executing the first prepared statement using the second table; and executing the second prepared statement using the third table.

19. One or more non-transitory computer-readable storage media comprising:

computer-executable instructions that, when executed by a computing system comprising at least one hardware processor and at least one memory coupled to the at least one hardware processor, cause the computing system to define a database trigger definition of a database trigger for a first table in a first computing language, the database trigger comprising a condition, a first insert operation, defined in a second computing language, to be executed when the condition is satisfied, and a second insert operation, defined in a third computing language, to be executed when the condition is satisfied, wherein the first computing language, the second computing language, and the third computing language are the same or where one or more differ, and wherein at least the first insert operation references a sequence, the sequence being incremented during trigger execution;

computer-executable instructions that, when executed by the computing system, cause the computing system to receive a database operation for the first table;

computer-executable instructions that, when executed by the computing system, cause the computing system to determine that the database operation for the first table satisfies the condition, thus activating the database trigger;

computer-executable instructions that, when executed by the computing system, cause the computing system to, in response to determining that the database operation that satisfies the condition, generate a second table, the second table comprising a first column comprising a first set of sequence values, the first set of sequence values having a number of elements corresponding to a number of times the first insert operation and the second insert operation will be executed as a result of the database operation;

computer-executable instructions that, when executed by the computing system, cause the computing system to, in response to determining that the database operation for the first table satisfies the condition, generate a third table, the third table comprising a second column comprising a second set of sequence values, the second set of sequence values having a number of elements corresponding to the number of times the first insert operation and the second insert operation will be executed as a result of the database operation;

computer-executable instructions that, when executed by the computing system, cause the computing system to execute the first insert operation in response to the database operation using the first table a number of times indicated by the first set of sequence values; and computer-executable instructions that, when executed by the computing system, cause the computing system to execute the second insert operation in response to the database operation using the second table a number of times indicated by the second set of sequence values;

wherein the first set of sequence values and the second set of sequence values allow multiple insert operations to be performed using a single database trigger, providing improved computing efficiency compared to executing the first insert operation and the second insert operations using separate triggers.

20. The one or more non-transitory computer-readable storage media of claim 19, wherein executing the first insert operation and executing the second insert operation are performed in parallel, further comprising:

computer-executable instructions that, when executed by the computing system, cause the computing system to generate a first prepared statement corresponding to the first insert operation;

computer-executable instructions that, when executed by the computing system, cause the computing system to generate a second prepared statement corresponding to the second insert operation;

computer-executable instructions that, when executed by the computing system, cause the computing system to execute the first prepared statement using the second table; and computer-executable instructions that, when executed by the computing system, cause the computing system to execute the second prepared statement using the third table.

* * * * *